(12) United States Patent
Bechhoefer et al.

(10) Patent No.: US 12,222,260 B1
(45) Date of Patent: Feb. 11, 2025

(54) VEHICLE HEALTH MONITORING SYSTEM FOR GROUND VEHICLES

(71) Applicant: GPMS International, Inc., Cornwall, VT (US)

(72) Inventors: Eric R Bechhoefer, Cornwall, VT (US); Joelle Kessler, Cornwall, VT (US); John Taylor, Cornwall, VT (US)

(73) Assignee: GPMS International, Inc., Cornwall, VT (US)

( * ) Notice: Subject to any disclaimer, the term of this patent is extended or adjusted under 35 U.S.C. 154(b) by 428 days.

(21) Appl. No.: 17/724,975

(22) Filed: Apr. 20, 2022

Related U.S. Application Data

(60) Provisional application No. 63/177,495, filed on Apr. 21, 2021.

(51) Int. Cl.
*G07C 5/08* (2006.01)
*G01M 17/007* (2006.01)

(52) U.S. Cl.
CPC ......... *G01M 17/007* (2013.01); *G07C 5/0808* (2013.01)

(58) Field of Classification Search
CPC .... G01M 17/007; B60W 50/00; B60W 50/02; B60W 50/0205; B60W 50/04; G06N 3/042; G06N 3/08; G07C 5/0808; G06F 30/27; G06F 2119/04
See application file for complete search history.

(56) References Cited

U.S. PATENT DOCUMENTS

| | | | |
|---|---|---|---|
| 6,728,658 B1 * | 4/2004 | Bechhoefer | G01N 29/4445 |
| | | | 702/183 |
| 9,778,281 B1 | 10/2017 | Bechhoefer | |
| 10,365,297 B2 | 7/2019 | Bechhoefer | |
| 2017/0082188 A1 * | 3/2017 | McKimpson et al. | |
| | | | G01N 33/2888 |
| 2017/0313332 A1 * | 11/2017 | Paget | B61L 25/026 |
| 2018/0059135 A1 * | 3/2018 | Bechhoefer | G01P 21/02 |
| 2019/0180527 A1 * | 6/2019 | Segal | G06N 20/00 |

(Continued)

OTHER PUBLICATIONS

Bechhoefer, et al., "A Comprehensive Analysis of the Performance of Gear Fault Detection Algorithms", The Annual Conference of the Prognostics Health Management Society, 2020.

(Continued)

*Primary Examiner* — Daniel M. Robert
(74) *Attorney, Agent, or Firm* — Downs Rachlin Martin PLLC

(57) ABSTRACT

A vehicle health monitoring system monitors the health of components for ground vehicles and accounts for the impact of changing engine RPM, a multi ratio gearbox, and the variable ratio encountered in vehicles having a differential. The vehicle health monitoring system may incorporate regime recognition that determines the vehicle state, e.g., the engine RPM, transmission gear ratio, whether its accelerating (or turning), so that a decision can be made whether the vehicle is in an appropriate regime for data acquisition for a monitored vehicle of the component, and if so, what type of configuration to use for analyzing the component for determining a condition indicator for that component. The configuration describes the ratio from a given tachometer to a shaft under analysis, and which, if any, gears/bearings are associated with the shaft.

1 Claim, 3 Drawing Sheets

(56) References Cited

U.S. PATENT DOCUMENTS

2021/0229679 A1\* 7/2021 Gießibl ............... B60W 10/119
2021/0335061 A1\* 10/2021 Claessens ............ G07C 5/0816

OTHER PUBLICATIONS

Bechhoefer, et al., "A Review of Time Synchronous Average Algorithms", Annual Conference of the Prognostics and Health Management Society, 2009.
Bechhoefer, et al., "Algorithms for Embedded PHM", IEEE PHM Conference, 2012.
Bechhoefer, et al., "Calculating a Tachometer Signal form Onboard a Smart Vibration Sensor", Proceedings of the Annual Conference of the PHM Society, 2018.
Bechhoefer, "The Case of the Missing Bearing Fault Frequency", Machinery Fault Prevention Technology Conference, Philadelphia, 2019.

\* cited by examiner

VEHICLE HEALTH MONITORING SYSTEM FOR GROUND VEHICLES

FIELD OF THE INVENTION

The present invention generally relates to monitoring the health of system components. In particular, the present invention is directed to a system and method for monitoring the health of components of ground vehicles.

BACKGROUND

Vehicles that have a high asset value or that are performing a critical mission benefit from vehicle health monitoring that allows for improved readiness, reduction in unscheduled maintenance, and higher reliability. Health monitoring of systems is currently utilized in several industries. Health monitoring in aviation has resulted in improved readiness, safety, and a reduction in operating cost. Similarly, condition monitoring in the energy sector (e.g., wind turbines, and steam and gas power generators) have long used health (or condition) monitoring to improve balance of plant, where indicators of component health are used to schedule maintenance opportunistically, thus improving availability and reducing cost.

However, condition/vehicle health monitoring has not been used as significantly for ground vehicles.

SUMMARY OF THE DISCLOSURE

A system is mounted on a ground vehicle for health monitoring of components of the ground vehicle that includes an onboard control unit (OBCU), a tachometer positioned to monitor an engine of the ground vehicle, a first sensor positioned to detect a signal from a differential of the ground vehicle, a second sensor positioned to detect a component signal from a component of the ground vehicle, and a data bus connecting the OBCU, the tachometer, the first sensor, and the second sensor. The system executes a set of instructions to identify a regime that the ground vehicle is operating in, determine whether the regime is appropriate for acquiring data from and performing a condition indicator analysis for the component, and determine, when the regime is appropriate for the component, a condition indicator value for the component based on the component signal and the signal from the differential, wherein the signal from the differential is used to determine a ratio from the tachometer to the component.

In another aspect of the invention, a system is mounted on a ground vehicle for monitoring the health of components and includes an onboard control unit (OBCU), a plurality of accelerometers mounted on the ground vehicle, wherein each of the plurality of accelerometers is mounted in order to detect signals from one of a plurality of components or subsystems of the ground vehicle including a transmission, a left front hub, a forward differential, a transfer case, a left after hub, an after differential, and a right after hub, and wherein each of the plurality of accelerometers is electronically connected to the OBCU via one or more data buses, and one or more tachometers mounted on the ground vehicle, wherein the one or more tachometers are electronically connected to the OBCU via the one or more data buses. The OBCU receives data from the one or more tachometers and one or more of the plurality of accelerometers and, based on the received data, executes a set of instructions to identify a regime that the ground vehicle is operating in, determine whether the regime is appropriate for acquiring data and performing an analysis for each of a plurality of scripts, wherein each of the plurality of scripts determines a set of condition indicators for a respective one of the plurality of components, determine, for each of the plurality of scripts for which the regime is appropriate for acquiring data and performing the analysis, whether a period of time has passed since a previous data acquisition and analysis is greater than a predetermined time period associated with respective ones of each of the plurality of scripts, wherein a set of appropriate scripts is selected, publish an assembly configuration to one or more of the plurality of accelerometers when the period of time is greater than the predetermined time period associated for each of the plurality of scripts in the set, wherein the one or more of the plurality of accelerometers are associated with respective ones of each of the plurality of scripts in the set, query the one or more of the plurality of accelerometers to perform a condition indictor analysis for a one of the one of the plurality of components based on data acquired from that component, and reset the period of time for each of the plurality of scripts for which the condition indicator analysis was performed.

In another aspect of the invention, a system mounted on a ground vehicle monitors the health of the ground vehicle and includes an onboard control unit (OBCU), a first data bus connecting the OBCU, a first tachometer positioned to monitor a drivetrain of the ground vehicle, and a plurality of sensors, the plurality of sensors including a first accelerometer mounted on the ground vehicle a position to and configured to detect signals from a transmission, a second accelerometer mounted on the ground vehicle in a position to and configured to detect signals from a left front hub, a third accelerometer mounted on the ground vehicle in a position to and configured to detect signals from a forward differential, a fourth accelerometer mounted on the ground vehicle in a position to and configured to detect signals from a transfer case, a fifth accelerometer mounted on the ground vehicle in a position to and configured to detect signals from a left after hub, a sixth accelerometer mounted on the ground vehicle in a position to and configured to detect signals from an after differential, and a seventh accelerometer mounted on the ground vehicle in a position to and configured to detect signals from a right after hub. A second data bus connects the OBCU, a second tachometer positioned to monitor an engine of the ground vehicle, and a second plurality of sensors, the second plurality of sensors including an eighth accelerometer positioned and configured to detect signals from the engine and a ninth accelerometer positioned and configured to detect signals from an alternator. The OBCU executes a set of instructions to identify a regime that the ground vehicle is operating in based on data received from the first tachometer, the first accelerometer, the second accelerometer, the third accelerometer, the fourth accelerometer, the fifth accelerometer, the sixth accelerometer, and the seventh accelerometer, determine whether the regime is appropriate for acquiring data from and performing a condition indicator analysis for a component of the ground vehicle, and determine, when the regime is appropriate for the component, a condition indicator value for the component based on the data.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
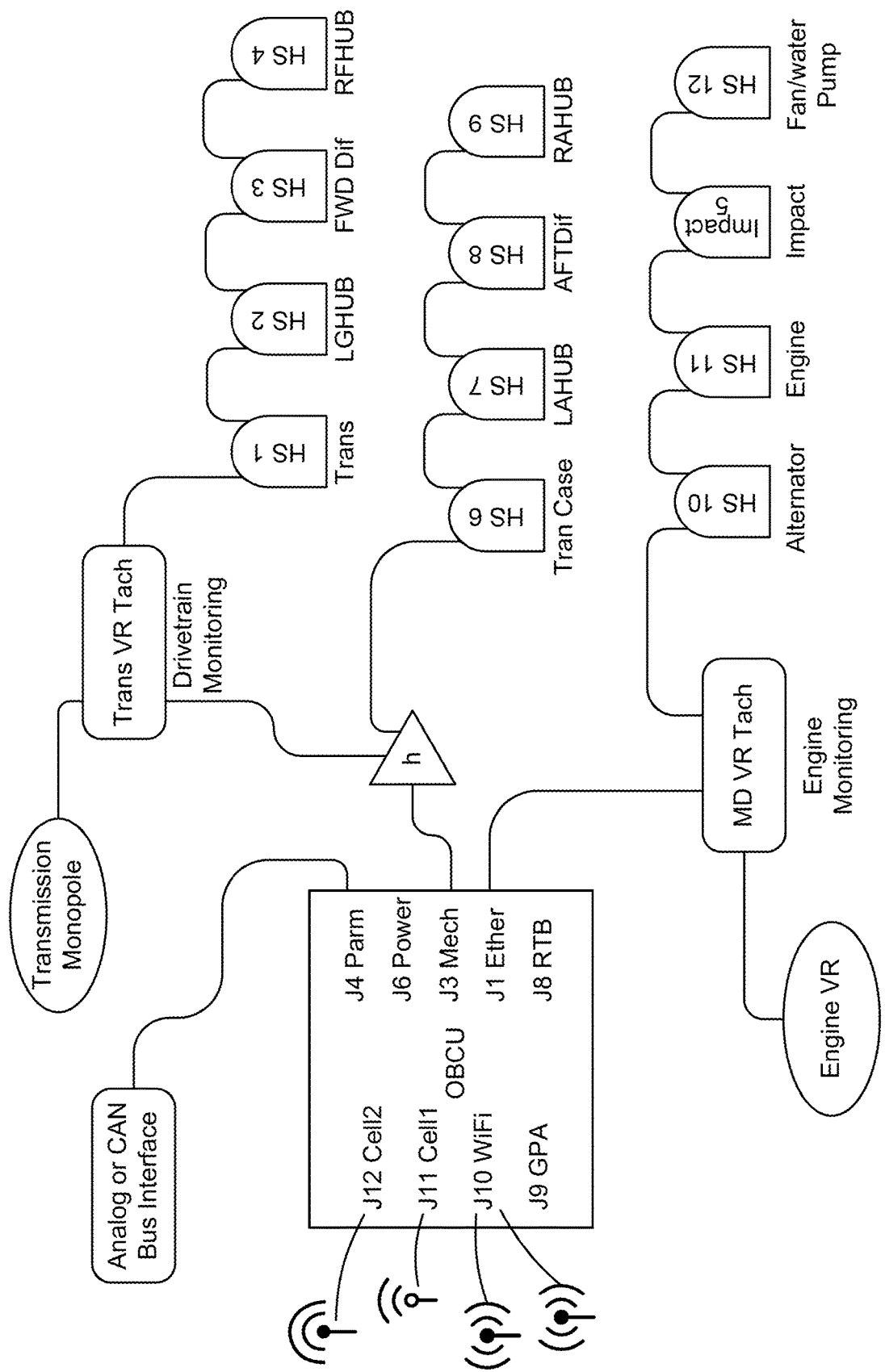
FIG. 1 is a schematic view of a ground vehicle health monitoring system (VHMS) using an edge processing bused architecture in accordance with an embodiment of the present invention.

Health monitoring of ground vehicles may provide significant benefits to operators of ground vehicles in many situations. Construction equipment (e.g., front end loaders, graders, bulldozers, excavators) all have high asset values. A maintenance event on a construction site involving such equipment directly affects revenue and the ability to complete a project on time.

Military ground vehicles (e.g., HMMVW, M1 Abrams, Bradley Fight Vehicle, Stryker) have mission readiness requirements, and a maintenance event in a combat situation may put the crew at risk.

The mission and design requirements of ground vehicles complicate the ability of health monitoring equipment to detect faults and function properly. Analysis of health in wind turbines, power generators, and helicopters often depends on the fact that the gearboxes for those systems have a single gear ratio and operate under a relatively narrow RPM range. Ground vehicles typically have multiple reduction gear sets and a wide range of engine RPMs that they operate under.

Further, ground vehicles have a differential. The differential allows the wheels/track to turn at different rates than each other. This is important, for example, when a vehicle is turning since the outside wheel covers greater distance and so must turn faster (at a higher rate) to maintain traction. Even when the vehicle is traveling straight, differences in tire pressure and wear can affect the diameter of the tire, which in turn affects the rates at which the left- and right-hand wheels spin.

The gear ratio and the slight differences in wheel rotation rates caused by the use of a differential in ground vehicles is important for health monitoring because effective vibration analysis requires a precise ratio from the tachometer to the shaft under analysis. Asynchronous vibration analysis, such as RMS or other simple condition indicators (CIs) are typically ineffective for gear or bearing fault detection in complex gearboxes and drives. Currently, most gearbox analysis is based on synchronous analysis. That is, the analysis uses a tachometer and a ratio from the tachometer to the shaft, gear, or bearing under analysis in order to isolate the component in the order domain. Typically, modern shaft and gear analyses use the time synchronous average that resamples the vibration data from time domain into order domain. Even very small errors in the ratio from the tachometer to the component under analysis can greatly degrade the quality of these analyses.

Variation in engine speed, which as noted is more common in ground vehicles compared to other systems that are typically monitored for health, also complicates component health analysis for a health monitoring system. Vibration monitoring systems typically use sensors that measure acceleration. Acceleration is the second derivative of displacement, which means that acceleration is proportional to the shaft rate squared. Hence, large changes in RPM will cause the acceleration magnitude to change, complicating the threshold setting and the analysis relating to remaining useful life of a component of such a system.

In the present invention, a vehicle health monitoring system is provided for ground vehicles that accounts for the impact of changing engine RPM, a multi ratio gearbox, and the variable ratio encountered in vehicles having a differential.

Vehicle health monitoring may incorporate regime recognition, which determines the vehicle state based on factors such as the engine RPM, transmission gear ratio, and/or whether the vehicle is accelerating (or turning). When the regime the vehicle is in is recognized, a decision can be made whether the vehicle is in an appropriate regime for component data acquisition, and if so, what type of configuration to use. Configuration as used herein describes the ratio from a given tachometer to a shaft under analysis, and which, if any, gears and/or bearings are associated with the shaft.

A regime recognition algorithm is used to determine the regime and may be a deep learning or artificial neural network, an if/then/else case tree, a Bayesian classifier, or another algorithm for classification. A classification algorithm takes parameter inputs such as engine RPM, yaw rate, shaft acceleration, and/or gear ratio to determine an appropriate action to take while in the recognized regime. The action can be represented as an integer representation of a binary value.

Regime recognition may be a continuous process involving sampling the vehicle parameter at a greater sample rate than the "bandwidth" of the vehicle. For many vehicles, such as trucks, calculating regime at 8 Hz, for example, is fast enough to ensure that the system does not miss any regime states between samplings. In general, at a frequency of 8 Hz, the regime recognition algorithm is called and during each cycle determinations are made based on the current regime, which then defines when to accrue usage of the vehicle, and when it is appropriate to perform analysis of components under analysis.

As an example, a VHMS may include the following actions that are desired to be known:
whether Engine Run time (ERT) is accrued
whether drive time (DT) is accrued
whether a mechanical diagnostics (MD) acquisition can be performed
whether a brake analysis acquisition can be performed in that regime
whether a wheel alignment acquisition can be performed in that regime
whether the wireless communications (XMIT) can be on for downloading the operations (indicating that the operation had terminated)

A binary mask integer representation of a vehicle with a four-speed transmission and a high/low transfer case could be defined as in the Binary Flag Coding example shown in Table 1:

TABLE 1

| BIT | ACTION | INTEGER (IF ACTIVE) | HEXIDECIMAL |
|---|---|---|---|
| 0 | XMIT (download or upload data) | 1 | 01 |
| 1 | Engine Idle (1)/Stopped (0) | 2 | 02 |
| 2 | Driving (1)/Stopped (0) | 4 | 04 |
| 3 | Transfer Case (Low 1) | 8 | 08 |
| 4 | Gear 1, Transfer Case High | 16 | 10 |
| 5 | Gear 2, Transfer Case High | 32 | 20 |

TABLE 1-continued

| BIT | ACTION | INTEGER (IF ACTIVE) | HEXIDECIMAL |
|---|---|---|---|
| 6 | Gear D, Transfer Case High | 64 | 40 |
| 7 | Gear OD (Over Drive) | 128 | 80 |
| 8 | Collect Raw Data Once | 256 | 100 |
| 9 | Diff/Wheel/Brake Rotor | 512 | 200 |
| 10 | Alignment | 1024 | 400 |
| 11 | Engine Performance | 2048 | 800 |
| 12 | Brake Pad Analysis | 4096 | 1000 |

For example, if the vehicle is not accelerating and the transfer case is in high while driving at an average speed, then the bit flag for this would be 2+4+64, or 70, as the:
- engine is running (accrue run time),
- the vehicle is moving/driving, which allows the accrual of drive time and distance driven (when flag bit 2 is active, the vehicle speed is multiplied by $1/28800$, the distance traveled in $1/8$th of a second, and added to the current distance), and
- it is appropriate to acquire data using a configuration that defines the associated shaft/gear/bearings and ratio.

In another example, the vehicle is deaccelerating hard so that the brakes are being used. Because the estimate of brake wear is an important vehicle state, analysis on the brake pads/rotors can only be conducted when the regime algorithm senses this condition. Based on the Binary Flag Coding, the bit flag for this example would be 2+4+4096, or 4072.

Sensor Inputs for the VHMS

A VHMS may include a number of systems, including a global navigation system for latitude, longitude, and time. An inertial measurement unit (IMU) might also be incorporated for obtaining pitch, roll, heading, and acceleration data. A barometric sensor and a temperature sensor could be used to calculate density altitude for engine performance analysis. Other inputs that may be implemented to analyze engine performance could be exhaust gas temperature, percent $O_2$, and differential pressure/boost between the air input plenum and input manifold (i.e., boost when turbocharged).

Inputs for this VHMS analysis include Engine RPM, Transmission Input RPM, Transfer Case RPM, Vehicle Speed, calculated gear ratio which is the input transmission RPM divided by the Transfer Case RPM), and the rate of change of speed. This data may be gathered through an interface with the vehicle.

Analog or digital interfaces with the vehicle may be used to gather parameter data in real-time. Many vehicles already measure the above data points, which can be gathered on the controller area network (CAN bus), while other vehicles may require a dedicated analog interface to calculate this data. In FIG. 1, a schematic for a VHMS 100 using an edge processing, bused architecture is shown that could be implemented on a diesel truck, for example.

VHMS 100 includes a plurality of high speed smart accelerometer sensors (e.g., HS1-HS9), which are located to monitor various components and systems of the vehicle, including the transmission (HS1), the left front hub (LFHUB, HS2), the forward differential (FWDDif, HS3), the right front hub (HS4), the transfer case (HS6), the left after hub (LAHUB, HS7), the after differential (AFTDif, HS8), and the right after hub (RAHUB, HS9) connected along with a variable reluctance tachometer (Trans VR Tach) that monitors the drivetrain on a data bus (J3) through an interconnect (h). As these sensors are smart, they process the data for condition indicators locally using tachometer data or tachometer from vibration data. The tachometer data represents zero cross data, that is, a vector of time synchronous with a target on a shaft, allowing for precise measurement of shaft rates. For example, the Trans VR Tach is a tachometer to measure the voltage for a variable reluctance (VR) sensor on the transmission. The VR sensor measures the change in flux of a 31-tooth gear that is driven by the input of the transmission. Similarly, the data bus interfacing with J8 processes data for the engine. In this structure, the analysis for the engine is separate from the rest of the drivetrain.

For many implementations, including the above example, the engine drives the transmission through a torque converter. Because of slip within the torque converter, the engine rate may be different than the rate of the drivetrain. Because of this difference, separate analyses may be run via segregation of sensors on different data buses. For the engine, sensors are mounted to do analysis on the alternator (HS10), engine (HS11), starter (labeled "impact" in FIG. 1), and water pump/cooling fan (HS12) and connected via a data bus, which also connects a tachometer (MD VR Tach) that reads a 1/Rev signal from the engine crank shaft.

The sensor on the starter may be a 100% duty cycle sensor that detects energy associated with the starter when the starter is engaged. This detected energy is proportional to damage or wear, so monitoring it over time can allow for determining when the starter needs to be replaced based on its determined condition. As the VHMS cannot anticipate when the vehicle is going to be started, a sensor with 100% duty cycle is required.

The sensors for the drivetrain/engine are mounted to their respective locations allowing for a "daisy chain" architecture. This process of routing may be used in either CAN Bus or RS485 data bus architecture.

The VHMS is controlled by an onboard control unit (OBCU), which incorporates a multiple-input multiple-output cellular antenna (e.g., J11, J12), a Wi-Fi antenna (J10), and a GPS antenna (J8). The OBCU also may have Ethernet or other physical media for the storage of data. The wireless interface integrated into the OBCU allows the transfer of data concerning the vehicle health to be automated.

The data bus for the VHMS shown in FIG. 1 is a four-wire system. Two wires provide 24 v DC power, and the other two wires provide for communications, such as by using the RS-485 electrical communication standard. An interconnect (labeled h) allows for the data bus to daisy chain, electrically, the sensors on the mechanical diagnostics bus (J3) for the drivetrain. J6 provides power to the OBCU, and the OBCU distributes 28 v DC power over the data bus. J1 provides external communication to the OBCU, in this example, over Ethernet. J8 provides data bus power/control to the Engine, while J4 provides power/communications to the analog or CAN Bus interface to the OBCU. J11 and J12 provide MIMO cellular antenna connection, while J10 is for Wi-Fi and J9 provides an antenna connection for the GPS receiver.

Each data bus communicates with the sensors, which are selectively mounted on the vehicle so that the health of the components over the entire vehicle (engine/drivetrain) can be determined. This type of data bus reduces the total weight of the system as well as the time and effort needed for VHMS installation. The sensors are positioned on the vehicle for which components will be monitored in locations appropriate for the monitoring. These parts are connected to each other via data buses that may be associated with different aspects of the system as described above. For example, as shown in FIG. 2, a vehicle such as a truck 200

Figure 2:
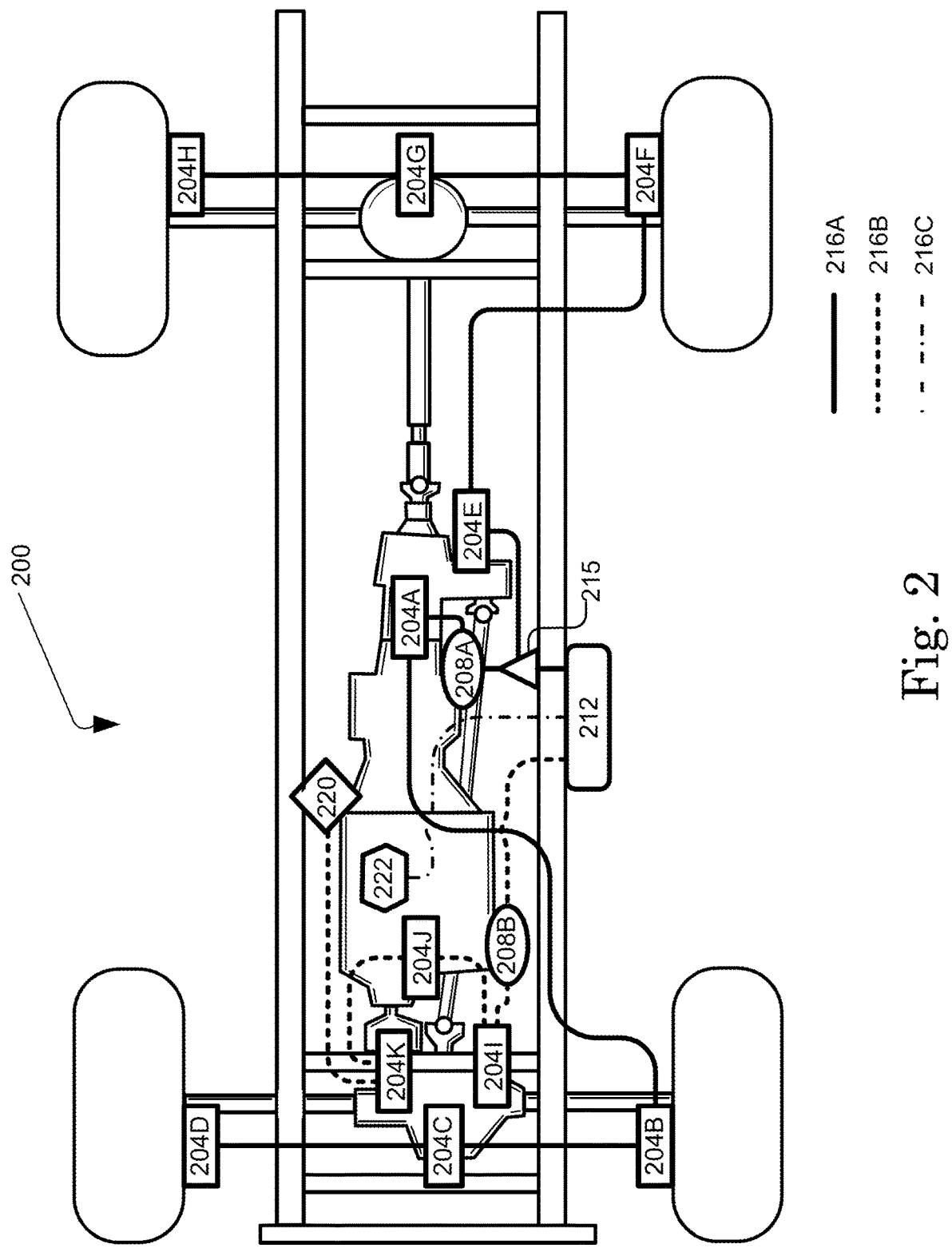
FIG. 2 is a schematic view of a VHMS on a truck showing exemplary placement of components of the VHMS in accordance with an embodiment of the present invention.

(a schematic portion of a chassis of truck 200 is shown in FIG. 2 for clarity), may include a VHMS with a plurality of accelerometers 204 (e.g., 204A-204K). Accelerometers 204A-204H are connected to each other or a subset of each other and ultimately to an onboard control unit (OBCU) 212 via a data bus 216A through an interconnect 215. Also on data bus 216A is a variable reluctance tachometer 208A. Accelerometers 204I-204K are connected to each ultimately to OBCU 212 via a second data bus 216B, which also includes impact 220 and a second variable reluctance tachometer 208B. An analog interface 222 is located near the engine and transmission speed sensors (variable reluctance) and connected to OBCU 212 via a third data bus 216C.

For the VHMS shown in FIG. 2, accelerometer 204A is positioned to monitor the transmission, accelerometer 204B is positioned to monitor the left front hub, accelerometer 204C is positioned to monitor the forward differential, accelerometer 204D is positioned to monitor the right front hub, accelerometer 204E is positioned to monitor the transfer case, accelerometer 204F is positioned to monitor the left after hub, accelerometer 204G is positioned to monitor the after differential, accelerometer 204H is positioned to monitor the right aft hub, accelerometer 204I is positioned to monitor the alternator, accelerometer 204J is positioned to monitor the engine, and accelerometer 204K is positioned to monitor the fan/water pump. Tachometer 208A is positioned to monitored the drivetrain and tachometer 208B is positioned to monitor the engine.

VHMS Parameters

Parameters regarding the configuration and operation of the ground vehicle to be monitored by the VHMS are required for analysis of data received by and from the sensors. For a truck that has, for example, a maximum engine RPM of 3400 (56.7 Hz), that maximum RPM can be considered an RPM of 100%. Further, the RPM when the engine is idle is 700 RPM (11.7 Hz, or 20.6%). Without loss of detail, the RPM in this context can be normalized as a percent of maximum. For this vehicle, the nominal RPM range is 1500 to 2300 RPM (44% to 68% with a mean of 56%, or 32.13 Hz.).

For a four-speed automatic transmission, example ratios are: 2.48, 1.48, 1, 0.75, and Reverse: 2.07. The transfer case ratios are: 1 or 2.72. In this example, the total gear ratio for all combinations is shown in Table 2.

TABLE 2

| 1/L | R/L | 2/L | D/L | 1/H |
|---|---|---|---|---|
| 6.7456 | 5.6304 | 4.0256 | 2.72 | 2.48 |
| R/H | OD/L | 2/H | D/H | OD/H |
| 2.07 | 2.04 | 1.48 | 1 | 0.75 |

Based on this example data, the following assumptions can be made.

When the transfer case is low, the mean speeds and standard deviations of speed for each gear are: Mean Speed Low [5.0 8.0 12.0 16.0], and STD=[1.3 2.1 3.1 4.2]

When the transfer case is high, the mean speeds and stand deviations of speed for each gear are: Mean High [13.0 22 33.2 42.6], and STD=[3.4 5.8 8.6 11.4]

The maximum (100% RPM) Speed is 76 mph.

As analysis on the brake pads and rotors can only occur during braking, it must be determined when the vehicle is braking. For analysis on the brakes, a deceleration is considered to be occurring when deceleration is-2.5 mph/sec, and an acceleration is considered to be occurring when acceleration is 2.5 mph/sec.

Since the shaft rate is a function of the ratio, and analysis is complicated at low shaft rates (under a few Hz), rules will be required in order to determine when it is appropriate to do the various analyses.

The transmission analysis will occur only when the transfer case is in high. This is to ensure the torque on the gearbox is high, which makes gear analysis easier (additionally, as noted, acceleration is a function of shaft rate squared, and higher RPM allows for higher signal to noise). This also ensures that the differential/axel shaft rates will be higher, improving analysis.

Analysis on the transfer case in low (gear ratio) will occur only when speeds are greater than 10 mph, while analysis for the transfer case in high occurs when the speed is greater than 30 mph.

For the wheel hub and differential, as noted, the ratio is not constant due to the differential, thus a signal processing technique to generate a "local" tachometer signal from vibration is used. Because the signal to noise for synchronous signals is greater at higher shaft rates, this tach from vibration processing will be triggered when the speed is greater than 30 mph.

Brake analyses requires data collected during the application of brakes at high speed, and so will be done when the vehicle speed is greater than a threshold value, such as 38 mph.

Given that tires when out of alignment usually have greater wear, they also generate more noise and vibration. The alignment analysis preferably occurs when the vehicle is in overdrive, with a speed greater than a threshold value, such as 33 mph.

Based on mean engine RPM and transmission ratio, a mapping of when analysis occurs can be generated for construction of the regime recognition cases. The bold values in Table 3 are speeds when analysis should occur for the associated component/system.

TABLE 3

| Analysis by Action | Nominal Speed by Gear Ratio | Component/Systems to be Analyzed |
|---|---|---|
| Low | 0, 7, 13, 18, 22 | Transfer Case Low |
| High | 0, 7, 13, 18, 22, 27, 33, 38, 43, 50, 60 | Transfer Case High |
| Brake | 0, 7, 13, 18, 22, 27, 33, 38, 43, 50, 60 | Pads |
| Diff | 0, 7, 13, 18, 22, 27, 33, 38, 43, 50, 60 | +Brake Rotors/ Wheel Hubs |
| Align | 0, 7, 13, 18, 22, 27, 33, 38, 43, 50, 60 | |
| Engine | 0, 7, 13, 18, 22, 27, 33, 38, 43, 50, 60 | |

To determine when the vehicle is traveling straight, the lateral acceleration and yaw rate are calculated and used to inform when the vehicle is in an appropriate regime for certain analyses. When the lateral acceleration and yaw rates are greater than a predetermined limit, drivetrain analysis would not be done because high acceleration and yaw rates indicate that the vehicle is turning. This, in turn, means that the wheels on the outside of the turn are rotating at a higher rate, or that the inside turn wheels are turning at a slower rate. Either of these conditions makes the determination of a zero cross tachometer vector representing the shaft rate more difficult.

If yaw rate is calculated in degrees per meter, the following conversions and assumptions can be made:

m/s=mph*0.44704

Yaw Rate is inDegrees/Sec

A turn means a greater than 10 degrees turn

Lateral Acceleration=$V^2$/Radius, where

Radius=Wheel Base/sin (alpha (10 degrees)), 3.3 m

Yaw (Y)=V/Radius

For a 0.1 g turn, the limits for acceleration and yaw rate (Y/dt) are determined in this manner and values for this example are shown in Table 4.

TABLE 4

| Values for a 0.1 g accel turn | | | | | | | | | |
|---|---|---|---|---|---|---|---|---|---|
| mph | 7 | 13 | 18 | 22 | 27 | 33 | 38 | 43 | 50 | 60 |
| m/s | 3.13 | 5.8 | 8.0 | 9.8 | 12 | 14.8 | 17.0 | 19.2 | 22.4 | 27.0 |
| Accel | 0.05 | 0.11 | 0.1 | 0.1 | 0.1 | 0.1 | 0.1 | 0.1 | 0.1 | 0.1 |
| Radius | 200 | 338 | 650 | 970 | 1460 | 2176 | 2890 | 3700 | 5000 | 7200 |
| Y/dt | 0.91 | 0.98 | 0.71 | 0.58 | 0.47 | 0.39 | 0.34 | 0.3 | 0.25 | 0.21 |

The Regime Algorithm

As noted, a number of analyses may be used for determining vehicle regime. Without loss of generality, a Bayesian classifier approach is described here. Some advantages of the Bayesian classifier include that it is a maximum likelihood estimator and in some respects preferable because the amount of data needed for configuration developed is low, it requires no training data sets, and the configuration is readable/editable to the system engineer. A Bayesian classifier is based on the statical concept of hypothesis testing.

Hypothesis Test Using the Bayesian Classifier

For a hypothesis test. P ($H_i$|z) is the probability that Ids was the true regime given a measured observation, z (such as yaw rate, lateral acceleration, engine RPM as a percentage of maximum, vehicle speed (mph), rate of change of speed, and the gear ratio between the transmission input and the output of the transfer case). The correct hypothesis is the one corresponding to the largest probability of the m possible regimes. The decision rule will be to choose the null hypothesis $H_o$ if:

$$P(H_0|z) > P(H_1|z), P(H_2|z) \ldots P(H_m|z) \quad \text{(Equation 1)}$$

else choose the greatest P ($H_i$|z). The null hypothesis may be a default case, such as that the engine is turning.

For illustration, consider the binary case, where the rule becomes:

$$\frac{P(H_1|z)}{P(H_0|z)} \begin{matrix} H_1 \\ > \\ < \\ H_0 \end{matrix} 1 \quad \text{(Equation 2)}$$

This is the maximum a posteriori probability criterion, wherein the chosen hypothesis corresponds to the maximum of two posterior probabilities. Using Bayes' rules to write the criterion gives:

$$P(H_i|z) = \frac{p(z|H_i)P(H_i)}{p(z)}, i = 0, 1 \quad \text{(Equation 3)}$$

where P ($H_i$) is the probability of $H_i$ in the observation space, such that:

$$\frac{P(H_1|z)}{P(H_0|z)} = \frac{p(z|H_1)P(H_1)}{p(z|H_0)P(H_0)} \quad \text{(Equation 4)}$$

This allows the test to become:

$$\frac{p(z|H_1)}{p(z|H_1)} \begin{matrix} H_1 \\ > \\ < \\ H_0 \end{matrix} \frac{P(H_0)}{P(H_1)} \quad \text{(Equation 5)}$$

The likelihood ratio is defined as l(z)=p (z|$H_1$)/p(z|$H_0$). If the likelihood ratio is assumed to be well behaved, i.e., everywhere continuous and differentiable, then without loss of generality, the natural logarithm of both sides can be taken. The logarithm is a monotonically increasing function so that the inequality holds. The log-likelihood ratio becomes:

$$\ln l(z) \begin{matrix} H_1 \\ > \\ < \\ H_0 \end{matrix} \frac{P(H_0)}{P(H_1)} \quad \text{(Equation 6)}$$

Because the probability function P ($H_i$) is usually some exponential function, such as Rayleigh, Gaussian, etc., taking the log linearizes the likelihood function.

In making a decision in a binary hypothesis-testing problem (e.g., is the system in Regime 0 or Regime 1), there are four possible outcomes:

Say $H_0$, and it is true that the vehicle is in regime 0;

Say $H_1$, and it is true that the vehicle is in regime 1;

Say $H_1$, but the vehicle is in regime 0; and

Say $H_0$, but the vehicle is in regime 1.

An error occurs when either the third or fourth conditions are chosen. The third condition is a type I error and the fourth condition is a type II error. It can be shown that the Bayesian Classifier, for a given probability of error, maximizes the probability of correct detection (e.g., it is optimal).

The Bayes Classifier for the Normal Distribution

Under many circumstances, the Normal distribution is a valid model of the distribution of the data. Without loss of generality, the Gaussian model is used for a generalized n dimension decision space. This decision space describes the parameters associated with the Regime Recognition (RR) algorithms and measured by the VHMS either with an analog or CAN bus interface.

As noted, the default case is the hypothesis $H_0$, defined as the mean of the parameter vector space, $m_0$, representing the parameters for regime 0. The probability distribution function of the parameter vector, z, given $H_0$, is defined by the Gaussian distribution (centered on $m_0$):

$$H_0 : m_0 = E[z_0] \quad \text{(Equation 7)}$$

$$p(z|H_0) = 1/(2\pi)^{n/2} \left|\sum\nolimits_0\right|^{-1/2} \exp\left[-1/2(z-m_0)^T \sum\nolimits_0^{-1}(z-m_0)\right]$$

An alternative hypothesis is:

$$H_1 : m_1 = E[z_1] \quad \text{(Equation 8)}$$

$$p(z|H_1) = 1/(2\pi)^{n/2} \left|\sum\nolimits_1\right|^{-1/2} \exp\left[-1/2(z-m_1)^T \sum\nolimits_1^{-1}(z-m_1)\right]$$

where $\Sigma_i$ is the covariance of the regime parameters. The normalized distance squared between the measured parameters z and any m:

$$d^2 = (z-m)^T \Sigma^{-1}(z-m) \quad \text{(Equation 9)}$$

Substituting the distance function into the log likelihood ratio test gives:

$$1/2[d_0^2 - d_1^2] + 1/2 \ln\left(\left|\sum\nolimits_0\right|/\left|\sum\nolimits_1\right|\right) \mathop{\gtrless}\limits_{H_0}^{H_1} \ln(P_0/P_1) \quad \text{(Equation 10)}$$

where $|\Sigma|$ is the determinant of the covariance. This states that if the normalized distance squared between z and $m_0$ (plus a threshold offset that represents the log ratio of test case probabilities) is small for the ith regime, then it is the most likely regime. A large distance means the regime is not likely. It is assumed that $P_0$ is equally likely with $P_1$, such that if the offset ($\ln(1)=0$) is greater than the normalized distance between z and $m_1$, then the alternate hypothesis, $H_1$ is accepted. In the specific vehicle regime case where there are 45 regimes, 44 tests are conducted against the null hypothesis (e.g., power on, engine not running). After completing the 44th test, where each test is negative, the null hypothesis (e.g., vehicle in regime 0) cannot be rejected. If there are positive test values, the maximum test value is selected and this accepts the alternative hypothesis and represents the maximum likely regime that the vehicle is in.

Example Regimes for a Truck

The Bayesian Classifier is a maximum likelihood estimator, and as such, it will always pick the regime that most nearly matches the measured data. Table 5 gives examples of regimes, and their associated flags (fg), where the flag describes the analysis to be performed during the regime.

TABLE 5

Example of Truck Regimes and Corresponding Flags

| Regime | | Flag | Regime | | Flag |
|---|---|---|---|---|---|
| 0: Power on, Engine Not Turning | | fg = 1 | 23: 38 MPH Right | (OD) | fg = 6 |
| 1: Power on, Engine Idle, (700 rpm) | | fg = 3 | 24: 38 MPH High RPM | (2H) | fg = 6 |
| 2: 7 MPH | | fg = 6 | 25: 43 MPH Straight | D | fg = 1542 |
| 3: 13 MPH Low | | fg = 14 | 26: 43 MPH Straight | OD | fg = 3718 |
| 4: 13 MPH High | | fg = 22 | 27: 43 MPH Left | | fg = 6 |
| 5: 18 MPH Straight Low | | fg = 14 | 28: 43 MPH Right | | fg = 6 |
| 6: 18 MPH Left | | fg = 6 | 29: 50 MPH Straight | DH | fg = 1030 |
| 7: 18 MPH Right | | fg = 6 | 30: 50 MPH Straight | (OD) | fg = 1030 |
| 8: 22 MPH Straight | | fg = 38 | 31: 50 MPH Left | | fg = 6 |
| 9: 22 MPH Left | | fg = 6 | 32: 50 MPH Right | | fg = 6 |
| 10: 22 MPH Right | | fg = 6 | 33: 60 MPH Straight | | fg = 6 |
| 11: 22 MPH High RPM (1H) | | fg = 6 | 34: 60 MPH Left | | fg = 6 |
| 12: 27 MPH Straight | | fg = 6 | 35: 60 MPH Right | | fg = 6 |
| 13: 27 MPH Left | | fg = 6 | 36: 60 MPH High RPM | (DH) | fg = 6 |
| 14: 27 MPH Right | | fg = 6 | 37: Deaccel (−2.5 mph/sec) low | | fg = 6 |
| 15: 33 MPH Straight | | fg = 2630 | 38: Deaccel Hard (−5.0 mph/sec) | | fg = 6 |
| 16: 33 MPH Left | | fg = 6 | 39: Deaccel (−2.5 mph/sec) high | | fg = 4102 |
| 17: 33 MPH Right | | fg = 6 | 40: Deaccel Hard (−5.0 mph/sec) | | fg = 4102 |
| 18: 38 MPH Straight | (D) | fg = 3590 | 41: Acceleration (2.5 mph/sec) | | fg = 6 |
| 19: 38 MPH Left | (D) | fg = 6 | 42: Acceleration (5.0 mph/sec) | | fg = 6 |
| 20: 38 MPH Right | (D) | fg = 6 | 43: Reverse Low (5.63) | | fg = 6 |
| 21: 38 MPH Straight | (OD) | fg = 1542 | 44: Reverse High (2.07) | | fg = 6 |
| 22: 38 MPH Left | (OD) | fg = 6 | | | |

In this example, a default ratio is 10.0, which occurs when the vehicle is not moving (where the ratio is undefined).

The below configuration is coded as XML, in which the <regs> label indicates that this is regime configuration. The <rt>125</rt> indicates that regime is performed 125/1000 seconds, or at 8 Hz. The regime labels give the index (i), the flag (f), the mean value (<m>) and standard deviation (<s>) for a set of parameters. For example, the parameters used for this truck example are yaw rate, lateral acceleration, engine RPM as a percentage of maximum, vehicle speed (mph), rate of change speed, and the gear ratio between in the transmission input and the output of the transfer case. In this example, there are 45 regimes that code those states that the truck can be in (listed in Table 5 above).

```
<regs>
    <rt>125</rt>
    <ri="0" f="1">
        <m>0.00, 0.00, 5.00, 0.00, 0.00, 10.00</m>
        <s>1.00, 0.10, 15.00, 3.00, 1.00, 10.00</s>
    </r>
    <r i="1" f="3">
        <m>0.00, 0.00, 21.00, 4.00, 0.00, 10.00</m>
        <s>1.00, 0.10, 15.00, 20.00, 1.00, 10.00</s>
```

```
</r>
<r i="2" f="6">
    <m>0.00, 0.00, 56.00, 7.00, 0.00, 10.00</m>
    <s>0.20, 0.10, 25.00, 3.00, 1.00, 10.00</s>
<r>
    <r i="3" f="14">
    <m>0.00, 0.00, 58.00, 13.00, 0.00, 2.72</m>
    <s>0.20, 0.10, 15.00, 3.00, 0.50, 0.20</s>
</r>
<r i="4" f="22">
    <m>0.00, 0.00, 56.00, 13.00, 0.00, 2.48</m>
    <s>0.20, 0.10, 15.00, 3.00, 0.50, 0.10</s>
</r>
. . .
. . .
. . .
    <r i="43" f="6">
    <m>0.00, 0.00, 44.00, 8.00, 0.00, 5.63</m>
    <s>0.40, 0.40, 15.00, 4.00, 5.00, 0.02</s>
</r>
    <r i="44" f="6">
    <m>0.00, 0.00, 30.00, 15.00, 0.00, 2.07</m>
    <s>0.40, 0.40, 15.00, 4.00, 5.00, 0.02</s>
</r>
</regs>
```

Application of Regime Flag to Sensor Configuration

As noted, the transmission in ground vehicles such as trucks can have different gear ratios. Associated with those gear ratios is a torque path through the transmission. The regime algorithm, using inputs from the vehicle, determines when it is appropriate to acquire data and which analysis should be performed. The analysis is governed by the configuration associated with a regime. The configuration example for condition analysis module (CAM) 1, which is a smart sensor, may be as follows:

```
<cam id="1" type="hs-accel" desc="Trans" channel="1">
    <acqcfg fg="16"><s>310.0</s><sh>S1,S2,S3,S4,S5</sh><w>W1A</w></acqcfg><asmcnfg fg="16">
    <s i="S1" r="1.0000000000" nb="4">
        <d i="DQ1" h="44"/>
    </s>
    <s i="S2" r="1.7200000000" nb="4">
        <g i="G2" t="65" b="17"/>
    </s>
    <s i="S3" r="1.5000000000" nb="4">
        <g i="G3" t="88" b="22"/>
    </s>
    <s i="S4" r="0.9806464290" nb="4">
        <g i="G5" t="46" b="12"/>
    </s>
    <s i="S5" r="2.4800000000" nb="4">
        <g i="G6" t="115" b="29"/>
    </s>
    . . .
    . . .
    <w i="W1A" l="4500" h="6500" pl="16384" ol="8192">
        <b i="A" s="S1" cg="0.46" bl="10.77" in="13.54" ou="11.46"/>
        <b i="B" s="S2" cg="0.4" bl="4.16" in="7.2" ou="4.8"/>
        <b i="C" s="S3" cg="0.56" bl="7.59" in="20.53" ou="14.5"/>
        <b i="D" s="S4" cg="0.46" bl="10.77" in="13.54" ou="11.46"/>
        <b i="E" s="S5" cg="0.4" bl="4.16" in="7.2" ou="4.8"/>
        <b i="F" s="S6" cg="0.56" bl="7.59" in="20.53" ou="14.5"/>
        <b i="G" s="S7" cg="0.46" bl="10.77" in="13.54" ou="11.46"/>
        <b i="H" s="S8" cg="0.4" bl="4.16" in="7.2" ou="4.8"/>
        <b i="I" s="S9" cg="0.56" bl="7.59" in="20.53" ou="14.5"/>
        <b i="J" s="S10" cg="0.56" bl="7.59" in="20.53" ou="14.5"/>
    </w>
</asmcnfg>
. . .
. . .
. . .
</cam>
```

Note that the smart sensor CAM I is described as "hs-accel" (high speed accelerometer), mounted on the Transmission (desc="Trans") on data bus channel one. The acquisition configuration (acqcfg) is flag 16 (fg="16"), which corresponds to bit four or a Gear 1. Transfer Case High ratio (see Table 5). This in turn maps to regime 4, which is the case in which the vehicle is traveling 13 mph, transfer case High, in Low gear. From Table 5, it is seen that the flag for regime 4 is 22. Flag 22 indicates that: (2) engine is on and accruing engine run time, (4) vehicle is accruing drive time and distance, and (16) the gear Low analysis on the transmission should be performed.

The acqcfg label indicates that the scale (<s>) that converts sensor voltage to Gs (measure of acceleration) is 310.0. Further, the acqefg label lists the analysis that will be performed. The shaft label (<sh>) indicates the shafts to be analyzed (e.g., S1, S2, S3, S4, S5). The analysis assumes a hierarchical structure. A shaft can have 0 to n gears and 0 to m bearings. The analysis for any bearing associated with a shaft is contained in the bearing envelope window label (<w>), which is, in this example, W1A.

The assembly configuration (asmenfg) holds the configuration data to perform an analysis in a hierarchical way. The example shows that shaft (<s>) S1 has a ratio of 1.0 from the tachometer, while shaft S2 has a ratio of 1.72. Other assembly configuration labels are <d> for data quality, which describes a sensor-wide analysis (one such input to data quality is a higher order harmonic <h>, the 44th in this case), and gear <g> analysis. Shaft S1 one has no gear, but shaft S2 has gear G2, with 65 teeth (<t> label), and the gear analysis uses a bandwidth of 17 (<b>).

The bearing envelope analysis uses a window <w>, W1A with lower bound of <l> of 4500 Hz, an upper bound of <h>6500, a power spectrum length <pl> of 16384, and overlap <ol> of 8192. Bearing analysis is performed using any suitable technique. Bearing "A" assigned to shaft S1, has a cage, <cg>, rate of 0.46, ball <bl> rate of 10.77, and an inner race <in> and outer race <ou> rate of 13.54 and 11.46, respectfully. This configuration data, when driven by tachometer data and configuration, allows for the shaft, gear, and bearing analysis to be performed. Note that bearings F, G, H, I, and J are associated with shafts on which analysis occurs at different regimes (e.g., transmission in 2, Drive, or Overdrive).

The tachometer sensor interface configuration exemplar is:
```
<cam id="50" type="tach" desc="Trans Tach" channel="1">
<acqcfg><t>T1</t><sh>S1,S2,S3,S4,S5,S6,S7,S8,S9,S10,S11,S12,S13,S14,S15,S16</sh></acqcfg>
<asmcnfg>
  <t i="T1" p="31" rll="700" r="1.0" s="g" nb="4" slim="300.0"/>
</asmcnfg>
</cam>
```

The tachometer sensor (CAM 50) is a type of tach, and is associated with the Transmission (dec="Trans Tach") on bus 1. The acquisition configuration identifies the sensor ID with label <t> at T1, which provides zero crossing data for sensors on the drivetrain, shafts S1 through S16. The tachometer sensor could be a variable reluctance sensor (e.g., VR, with a sensor label s="g" for generator), or PNP/NPN sensor (s="h" for hall or s="o" optical sensor). The pulse per revolution on this tachometer is 31. That is, the VR sensor measures the passage of 31 teeth on a wheel driven at the input to the transmission.

If the mean engine RPM is 1928 RPM, then the transmission sensor, CAM 50, would measure 1928/60*31, or 996 Hz. CAM 50 only publishes its measured data once per revolution zero cross by decimating the zero cross times by 31. That is, the VR sensor measures the passing of each tooth past the sensor. The time for one revolution is then every 31 measurements, meaning only data and the time delay for each 31 data points is used. Hence, the vector of zero cross times for a two second acquisition would have on average 64 values, with a mean of 0.0311 seconds between values. The average shaft rate for S1 would be 32.1 Hz, and the fault frequencies for bearing "A" cage, ball, inner and outer race would be, respectively: 14.78 Hz, 346.04 Hz, 435.04 Hz, and 368.21 Hz. However, for shaft S1, the rate would be: 32.1 Hz*1.72 (the ratio) to give 55.26 Hz, and the bearing fault frequency for "B" would be: [0.4, 4.16, 7.2, 4.8] *55.26=22.10 Hz, 229.88 Hz, 397.87 Hz. and 265.24 Hz. In this way, it is possible to identify uniquely a shaft, gear, or bearing fault in a complex gearbox, because each component's source signature can be identified based on expected frequencies.

As noted, the regime recognition function periodically returns (at 8 Hz, for example) the current regime, which includes the bit flag. The onboard control unit (OBCU) then determines an action to be carried out, if appropriate, by the flag. The OBCU action is controlled by flag, which allows the appropriate configuration to be selected and the command to be sent to the sensors, such as to acquire and process data. The OBCU determines this behavior from a script that provides the rules as to what to do, and when to do it. For example, script 3 describes a process where if the time since the last acquisition has been greater than one minute, and the current regime flag is 16 (e.g., regime 4), the script is processed.
```
<script index="3" period="1M" channel="1" init="0" f="16" desc="Perform Acquisition" actcode="ACQ">
  <cam id="1" sampcode="23438" secs="4"/>
  <cam id="6" sampcode="46875" secs="2"/>
  <cam id="50" sampcode=" " secs="4"/>
</script>
<script index="4" dependson="3" period="10M" channel="1" init="0" f="272" desc="Read Raw Data" actcode="RAW">
  <cam id="1"/>
  <cam id="6"/>
  <cam id="50"/>
</script>
```

In script 3, CAM 1 is commanded to collect (actcode="ACQ") data for 4 seconds at 23,438 samples per second (sps), synchronously with CAM 6 (the sensor monitoring the transfer case) and CAM 50, which is the tachometer. The script does not initialize (init="0") the sensors, which is the case for the analog interface. Initialization would be required for the analog or CAN bus sensor interface.

Script 4 depends on the success of script 3, and once every 10 minutes reads a sensor's raw data, which for this acquisition could be large (4*23438+2*46875+tach zero crossing vector). Occasionally, having raw data allows for experimentation and validation of the condition indicator data, and development of new analyses. As download performance will degrade with larger files, script 4's flag of 272 (256+16) indicates that this data download only happens once per operation. That is, bit 8, (integer value 256), has been configured to only collect data once. Thus, 256 is a reserved label to allow raw data collection once per operation.

Referring to Table 5, other flags which relate to the transmission analysis are:
  32, regime 8, 22 MPH
  64, regime 15, 33 MPH
  128, regime 26, 43 MPH
Thus, for regime 8 (transmission in second gear), CAM 1 assembly configuration <asmcnfg> references only shaft 6 (ratio 1.5), shaft 7 (ratio 1.5), and shaft 8 (ratio 2.07) and their associated gears/bearings.
```
<s i="S6" r="1.5000000000" nb="4" fg="32">
  <g i="G7" t="65" b="17"/>
</s>
<s i="S7" r="1.5000000000" nb="4" fg="32">
  <gi="G8" t="17" b="5"/>
</s>
<s i="S8" r="2.0700000000" nb="4" fg="32">
  <g i="G9" t="17" b="5"/>
</s>>
```
For regime 15 (transmission in drive), on the other hand, CAM 1 assembly configuration <asmcnfg> references shaft 9 and its associated gear/bearings.
```
<s i="S9" r="1.5000000000" nb="4" fg="64"><gi="G10" t="88" b="22"/>
</s>
```
Finally, regime 26 (transmission in overdrive), CAM I assembly references shaft 10,
```
<s i="S10" r="1.5000000000" nb="4" fg="128">
  <g i="G5" t="46" b="12"/>
</s>
```
This configuration schema allows for encoding and transmitting the correct configuration required for analysis of complex, multi gear ratio gearboxes found in ground vehicles.

As noted, the reserved label 256 indicates that raw data is collected once per operation. An operation is used to marshal and aggregate data associated with a mission.

Analysis of Non-Fixed Ratio Shafts

The regime 15, 18, 25 and 26 have flags that contain a 512 integer value. This flag is associated with a Differential/Wheel/Brake Rotor analysis. That is, because of the differential, the shafts from the differential to the wheels have slightly different rates. The regime associated with this analysis is one in which the vehicle is at a relatively high speed, with the engine at a relatively constant RPM, and when the vehicle is not turning. These conditions allow for a better calculation of a local tachometer for each hub, based on a determination that derives tachometer information from a vibration signal. U.S. Pat. No. 10,365,297, titled "System and Method for Generation of a Tachometer Signal and Reduction of Jitter," discloses such a determination and is incorporated by reference for its discussion of the same.

Tachometer data obtained from vibration signals can be performed on a separate firmware product, although it can also use the same hardware as the high-speed smart sensors disclosed herein. As such, the configuration is unique to the sensor type (type="hs-tachfvibe", for example). In general, hs-tachfvibe uses a two-step process to calculate a local tachometer.

Step one is to ideally bandpass and create an analytic signal in one functional procedure. Step two is to use a jitter reduction model to remove noise (jitter) from the reconstructed tachometer signal that is not associated with changes in machine rate. This technique is well-suited for implementation in a smart sensor, where cost and weight considerations can be addressed by a lower cost condition monitoring system.

Pseudo code to recover a tachometer signal from vibration (Step One) may be as follows:
Define the Sample rate=sr (from the appropriate script).
The number of data points of vibration data, n=sr× acquisition length in seconds, then:
Calculate the next larger radix-2 length for the FFT. nRadix=2^ceil ($\log_2$ (n))
Calculate the low and high bandwidth index (bwlow, bwhigh), which are centered on a known gear mesh or shaft rate.
Take the zero padded FFT of the vibration data.
Zero the FFT from zero to bwlow, and from bwhigh to nRadix
Take the inverse FFT, generating the analytic signal
Calculate the unwrapped argument of the signal from 1 to n time series.
Normalize the time series of radians by the shaft harmonic. For a simple shaft, this value is 1. If the shaft has a gear, the gear mesh is used. This is the number of teeth of the gear (assuming $1^{st}$ harmonics)
Interpolate the number of indexes for every 2π radians
Normalize to tachometer zero crossing times by sr
A bandpass filter is the convolution of a low pass filter with a high pass filter. These filters are implemented as Finite Impulse Response (FIR) filters to improve their stability. However, even rather large filters have a poor response, so an idealized bandpass filter is used.

An analytic signal may be developed using an ideal filter such that it is completed in a single functional process. The analytic signal is defined for real the real-valued signal s(t) as Equation 11:

$$S(f)=F\{s(t)\} \quad \text{(Equation 11)}$$

where F is the Fast Fourier Transform, and where:

$$S_a(f)=S(f), f=0 \quad \text{(Equation 12)}$$

$$S_a(f)=2S(f), f>0 \quad \text{(Equation 13)}$$

$$S_a(f)=0, f<0 \quad \text{(Equation 14)}$$

$$s_a(t)=F^{-1}(S_a(f)) \quad \text{(Equation 15)}$$

S(f) is as noted, the Fourier transform of s(t).

For a signal which is sampled at 97,656 samples per second, for six seconds, the total length of s(t) is n, 585,936 data points. As noted, there are advantages to using radix 2 lengths for the Fast Fourier Transform (FFT). By zero padding the FFT to next larger radix-2 value, $2^{20}$ or 1,048, 576, the index representing the cutoff frequency for the bandpass values are: bwlow=910 Hz/97656× 1048576=9771, and bwhigh=960/97656*1048576=10308. Then one can define the bandpass analytic signal as shown in Equations 16-18:

$$S_a(f)=2S(f), \text{bwlow} \le f \le \text{bwhigh} \quad \text{(Equation 16)}$$

$$S_a(f)=0, f<\text{bwlow}, f>\text{bwhigh} \quad \text{(Equation 17)}$$

$$s_a(t)=F^{-1}(S_a(f)) \quad \text{(Equation 18)}$$

There is no need to multiply by 2 (as per a traditional Hilbert transform), as the argument (e.g., angle) of interest, is the arctangent ratio of the imaginary parts of $s_a$ (1) and the real parts of sa(i). The idealized band pass function rejects all signals not associated with the desired passband.

This idealized filter allows for a higher signal to noise ratio and improved reconstruction of the tachometer signal from vibration. This tachometer signal is recovered from the arctangent of the analytic signal.

Further, the arctangent function returns radians between 0 to π and −π to 0. However, the evolution of the angle represents the incremental increase in phase for each sample in time. For example, the phase of the analytic signal for three cycles is 2π×3 or 6π. The arctangent of that signal will be −π to π for 3 cycles. The result of the arctangent must be unwrapped to capture the incremental increase in angle vs. time. Unwrapping of the angle requires keeping track of the previous angle and current angle. The current angle is added to the previous angle, except when the returned arctangent goes from π to −π. In this case, π is added to the returned value to correct for the case when the returned value is between −π to 0.

After unwrapping the phase angle, the units are in radians per sample. While the FFT and inverse FFT are operated on the radix-2 length (in this case 1048576), the argument and phase angle computation are performed only on the original sample length, n. This time series of radians is for the gear mesh. To convert to radians per revolution of the shaft, the time series is divided by the number of teeth on the gear.

However, it may be that the most reliable gear mesh tone is the $2^{nd}$ or $3^{rd}$ harmonic, in which case the passband is adjusted accordingly, and the time series of radian angle is divided by 2× the number of teeth for the $2^{nd}$ harmonic, for example.

The resulting time series represents the radian angle of the shaft, where each index advances the angle in time by dt, or 1/sample rate. Every 2π radians represent one shaft revolution. Because time is of interest in this context, every 2π a form of interpolation is needed. For example, the index just prior to 2π is 6.282780795474 (or 0.0004 less than 2π) at array index 3395, and at index 3396 the radian value is 6.284629142378, or 0.0014 greater than 2π. Interpolation between the index 3395 and 3396 provides for a radian value of 2π. In this example, the interpolated value is 3395.21885053316. Now the zero cross time is calculated by taking each interpolated value and dividing by the sample rate. The zero-cross time for 3395.21885053316 is 0.03476713 seconds.

This interpolation gives the number of indexes, and thus time, for each revolution. This estimate of the tachometer zero cross signal can be corrupted by noise. Tachometer jitter can be contained by a low-frequency component associated with the engine control unit and random higher frequency components. Gear fault detection can be improved by using zero phase, low order Infinite Impulse Response (IIR), backward/forward filtering, as discussed in U.S. Pat. No. 9,778,281, titled "Tachometer Signal Jitter Reduction System and Method," which is incorporated by reference for its discussion of the same. Both FIR and IIR filters bandwidth are defined by the 3 dB reduction in signal energy. The filter does not remove all signals above the bandwidth, and in fact, reduces up to 50% of the signal energy below the cutoff.

Finally, to remove jitter in the tachometer signal itself, the process as outlined in U.S. Pat. No. 10,365,297, titled "System and Method for Generation of a Tachometer Signal and Reduction of Jitter," and is incorporated by reference for its discussion of the same, is used.

Tachometer from Vibration Configuration

The configuration for the tachometer data derived from vibration sensor data (type="hs-tachfvibe) needs to support the analysis of shaft, gears, and bearings, without a physical tachometer for zero cross time vector. As noted in the tachometer data from vibration analysis description above, an initial approximation for the shaft rate is needed. The configuration will therefore need to allow the OBCU to retrieve this data (which is proportional to vehicle speed) and apply it to the analysis. Vehicle speed data can come from the analog interface or from the vehicle CAN bus, if it is available.

An analog interface may have a frequency to voltage converter. The frequency to voltage converter takes an input, such as that from the transfer case (which incorporates a speed sensor for the miles per hour (MPH) display in the cabin of the vehicle) and in real time converts this to voltage, which will be proportional to speed. For example, in an example truck, at 41.5 MPH the measured output is 23 Hz from the speed sensor. The maximum speed of the vehicle is 76 MPH, such that 100% MPH is mapped to 42.6 Hz. Thus, at 23 Hz, or 41.5 MPH, the output of the analog (or CAN bus interface) speed is 54.6%.

The aforementioned truck may incorporate a portal hub to increase ground vehicle clearance. The input shaft to the hub from the differential has a 12-tooth pinion, while the wheel hub itself has a 23-tooth gear. The wheel diameter, for this example, is 37 inches (or a circumference of 116.24 inches). The wheel rate at 100% (e.g., 76 MPH) is then 11.5074 Hz, and the gear mesh frequency would be 11.5074×23=265.669 Hz. An example configuration for the type="hs-tachfvibe" sensor is:

```
<cam id="2" type="hs-tachfvibe" desc="LF Hub" channel="1">
    <acqcfg><s>1.0</s><t>T2</t><sh>S24,S25,S36</sh><w>W2</w></acqcfg>
    <asmcnfg>
        <s i="S24" r="1.0000" nb="4" fg="512">
            <g i="G26" t="12" b="3"/>
            <di="DQ2" h="13"/>
        </s>
        <si="S25" r="0.5217391" nb="4" fg="512">
            <gi="G27" t="23" b="6"/>
        </s>
        <s i="S36" r="0.5217391" nb="4" fg="1024">
            <g i="G28" t="56" b="14"/>
        </s>
        <w i="W2" l="4500" h="6500" pl="4096" ol="2048">
            <bi="K" s="S24" cg="0.55" bl="8.42" in="10.66" ou="8.25"/>
            <bi="L" s="S25" cg="0.44" bl="7.94" in="9.55" ou="7.45"/>
            <bi="M" s="S25" cg="0.37" bl="3.44" in="7.62" ou="4.38"/>
        </w>
        <tv i="T2" p="1" r="1.0" rpmpid="21" rpmfrq="265.669" rpmh="12"/>
    </asmenfg>
</cam>
```

This analysis uses zero cross data derived from <t>tachometer T2, where T2 is a virtual (i.e., local) tachometer signal. The T2 tachometer data is derived from vibration processing. The sensor receives speed as a percentage of RPM from the OBCU when the sensor is commanded to perform an analysis. In this example, the RPM data is calculated from analog parameter 21 (label rpmpid). The percent speed is multiplied by rpmfrq (RPM frequency at 100%) and gives the frequency of the ideal bandpass filter needed by the tachometer for vibration processing. The label <rpmh> gives the harmonic needed for calculation of zero cross times.

In the aforementioned example, if the truck is traveling straight at 41.5 mph, the OBCU would measure from the analog interface a value of 54.6%. The regime algorithm determines that the truck is in regime 25. Since it has been greater than a 1-minute period since script 13 has last run, the OBCU commands a 2 second acquisition at 23438 sps with an RPM speed of 54.6.

```
<script index="13" period="1M" channel="1" init="0" f "1536" desc="Perform Acquisition" actcode="ACQ">
    <cam id="2" sampcode="23438" secs="2"/>
    <cam id="4" sampcode="23438" secs="2"/>
    <cam id="6" sampcode="23438" secs="2"/>
    <cam id="8" sampcode="23438" secs="2"/>
    <cam id="50" sampcode=" " secs="1"/>
</script>
```

The CAM receiving the command acquires 2 seconds of data at 23483 and commences the tachometer from vibration data processing with a band pass filtered centered at 0.546× 265.669 or 145.06 Hz. The tachometer from vibration processing, using input pinion harmonic of 12, includes the calculation of the zero-crossing time vector associated with the half shaft rate of 12.09 Hz (i.e., 145.06/12), while the wheel hub speed is 12.09*0.5217391 (the ratio from the half shaft to the wheel hub) of 6.31 Hz. With this derived tachometer signal, the shaft, gear and bearing analysis proceeds as described for the high speed accelerometer (hs-accel).

VHMS Analysis Flow

In general, an operation will be considered to occur during the time from engine start until engine stop. Hence, when the engine is stopped (RPM<500, which is below idle), the operation is terminated, the vehicle state file is closed, and files are automatically downloaded (wirelessly, wired or through transfer of media, such as a USB flash drive). The OBCU:

Initializes sensors and vehicle interfaces when powered.
Determines the current regime the vehicle is in.
On Engine Start, starts an operation.
During the operation, the regime recognition function determines the current vehicle state (i.e., regime).
Scans the list of scripts to see if regime flag matches a script.
If a script matches, and the time from the last acquisition/action is greater than the period of the script, the script is executed by publishing the appropriate configuration for the sensors in the script.
If the sensor is a hs-accel (e.g., associated with a known ratio), based on the regime flag, the configuration for the appropriate shaft/gears/gearings is sent, such as the ratio for a tachometer interface for a shaft, the number of gears (and gear teeth) on the shaft under analysis, and the bearing data associated with the shaft.

If the sensor is a hs-tachfvibe (associated with tachometer data derived from vibration data), an estimate for the shaft under analysis rate (derived from the vehicle interface) is sent, along with other pertinent configuration information, to facilitate analysis.

When the engine stops, the operation is completed, and data is downloaded.

Data is then viewable for a maintainer to make decisions.

Figure 3:
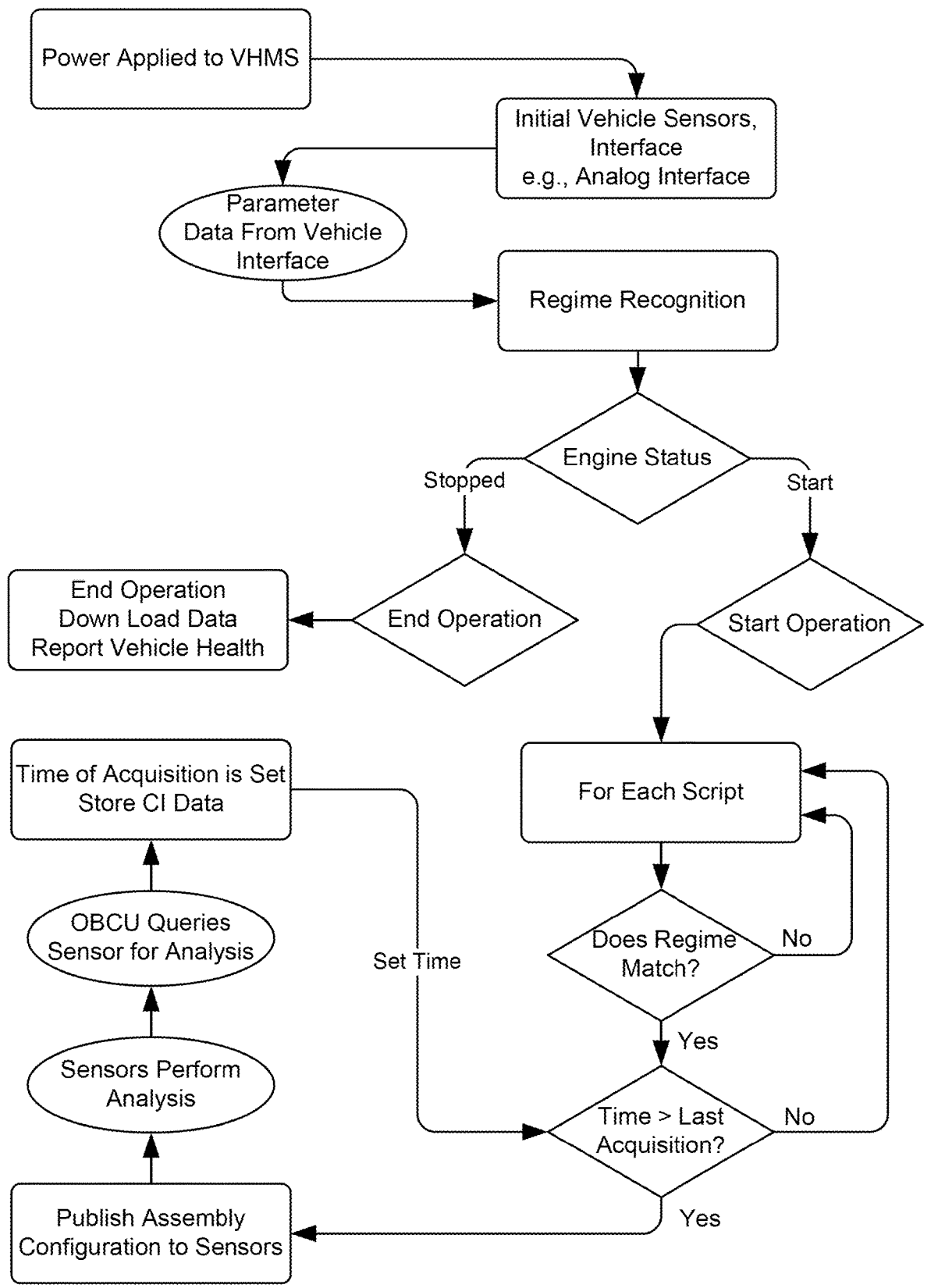
FIG. 3 is a flowchart for analysis flow for component health monitoring on a ground vehicle VHMS.

FIG. 3 is a flowchart providing an exemplary overview of VHMS analysis flow. Power is applied to the VHMS, which then initiates vehicle sensors and vehicle interfaces, such as an analog interface. Parameter data is received from the vehicle interfaces, and used to recognize the regime the vehicle is in. The engine status is determined. If the engine is stopped, the operation is ended and end of operation protocols are performed, such as downloading data and reporting vehicle health.

If the engine status is started, and an operation is determined to have started, each script is processed. For each script, it is determined whether the regime is appropriate for performing the script. If not, the process for that script returns to the previous step to determine whether the next determined regime is appropriate for performing the script. If the regime is appropriate, it is determined whether the predetermined time period between acquisitions has passed since the last acquisition for the script. If the time period is less than the predetermined time period, the process for the script under concern returns to the step for determining whether the current regime is appropriate for that script. If the time lapsed is greater than the predetermined time, the assembly configuration for the script is published to the appropriate sensor(s). Each sensor receiving the assembly configuration acquires data and performs the analysis for the script. The OBCU queries the sensor for analysis, and if an analysis was performed for a given script, the time of acquisition for that script is set (or reset), and the Condition Indicators for components determined from the acquisitions are stored. The new set time for the script is used for determining whether/when to perform the next analysis for the given script.

In a VHMS, typical condition indicators for a shaft analysis could include shaft order 1 magnitude, shaft order 2 magnitude, shaft order 3 magnitude, time synchronous average RMS, and time synchronous average peak to peak. For gear analysis, condition indicators could include residual RMS, residual kurtosis, residual crest factor, energy ratio, energy operator RMS and kurtosis, sideband lifting factor, figure of merit 0, narrow band kurtosis, amplitude modulation RMS and/or kurtosis, and frequency modulation RMS and/or kurtosis. Bearing condition indicators are preferably based on the envelope analysis, which measures the energy associated with bearing cage, ball, inner and out race fault frequencies.

While an operation is ongoing, parameter data will continue to be acquired at step 312 and regime determinations will continue to be made at step 316, both to determine when an operation should be ended and for determining whether the current regime is appropriate for each script at decision 340.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system mounted on a ground vehicle for monitoring health of the ground vehicle comprising:
    an onboard control unit (OBCU);
    a first data bus connecting the OBCU, a first tachometer positioned to monitor a drivetrain of the ground vehicle, and a plurality of sensors, the plurality of sensors including a first accelerometer mounted on the ground vehicle a position to and configured to detect signals from a transmission, a second accelerometer mounted on the ground vehicle in a position to and configured to detect signals from a left front hub, a third accelerometer mounted on the ground vehicle in a position to and configured to detect signals from a forward differential, a fourth accelerometer mounted on the ground vehicle in a position to and configured to detect signals from a transfer case, a fifth accelerometer mounted on the ground vehicle in, a position to and configured to detect signals from a left after hub, a sixth accelerometer mounted on the ground vehicle in a position to and configured to detect signals from an after differential, and a seventh accelerometer mounted on the ground vehicle in a position to and configured to detect signals from a right after hub; and
    a second data bus connecting to the OBCU, a second tachometer positioned to monitor an engine of the ground vehicle, and a second plurality of sensors, the second plurality of sensors including an eighth accelerometer positioned and configured to detect signals from the engine and, a ninth accelerometer positioned and configured to detect signals from an alternator,
    wherein the OBCU executes a set of instructions to:
        identify a regime that the ground vehicle is operating in based on data received from one or more of the first tachometer, the first accelerometer, the second accelerometer, the third accelerometer, the fourth accelerometer, the fifth accelerometer, the sixth accelerometer, and the seventh accelerometer;
        determine whether the regime is appropriate for acquiring data from and performing a condition indicator analysis for a component of the ground vehicle; and
        determine, when the regime is appropriate for the component, a condition indicator value for the component based on the data, wherein the condition indicator value is further based on a ratio from a tachometer value derived from vibration signals to the component.

\* \* \* \* \*